United States Patent [19]

Arnold

[11] 4,062,512
[45] Dec. 13, 1977

[54] CLAMP FOR SECURING BAR HANGER TO ELECTRICAL WIRING BOX

[75] Inventor: William O. Arnold, Parkersburg, W. Va.

[73] Assignee: Union Insulating Company, Parkersburg, W. Va.

[21] Appl. No.: 729,968

[22] Filed: Oct. 6, 1976

[51] Int. Cl.² .............................................. A47F 5/00
[52] U.S. Cl. ................................ 248/309 R; 174/63; 220/3.9; 248/DIG. 6
[58] Field of Search ...... 24/132 LS, 248 CR, 248 LS, 24/248 SA, 285; 174/63; 220/3.9; 248/57, 309, DIG. 6

[56] References Cited
U.S. PATENT DOCUMENTS

| 1,777,291 | 10/1930 | Clayton | 174/63 |
| 1,798,838 | 3/1931 | Garvin | 174/63 |
| 2,758,810 | 8/1956 | Good | 220/3.9 X |
| 3,528,636 | 9/1970 | Schmidt | 220/3.9 UX |

*Primary Examiner*—James C. Mitchell
*Attorney, Agent, or Firm*—Peter Xiarhos; Elmer J. Nealon; Norman J. O'Malley

[57] ABSTRACT

A clamp for securing an adjustable bar hanger to a molded thermosetting plastic electrical wiring box. The clamp includes a generally U-shaped portion having a deformable tab directed into the region defined by the U-shaped portion, a first pair of spaced-apart L-shaped positioning tabs at one side of the U-shaped portion, and a flange extending outwardly from the other side of the U-shaped portion. A bar hanger is positioned within the U-shaped portion of the clamp, and the wiring box is oriented with respect to the clamp and bar hanger assembly so that the pair of L-shaped positioning tabs can be readily inserted within a corresponding pair of spaced-apart slots formed in a rear wall of the wiring box. The wiring box is then pivoted with respect to the clamp so that the bar hanger is captured between the clamp and the rear wall of the wiring box with the clamp being spaced a slight distance from the rear wall of the wiring box. A metal screw is then inserted through a screw-receiving opening in the rear wall of the wiring box and threaded into a corresponding threaded opening in the flange of the clamp. As the screw advances into the opening in the flange, the clamp is drawn toward the wiring box, causing the tab of the U-shaped portion to deform and move in a direction away from the wiring box and toward the U-shaped portion. The deformation of the tab serves to distribute the torque or energy applied to the screw in a manner so as to prevent damage to the wiring box, such as cracking or shattering.

8 Claims, 8 Drawing Figures

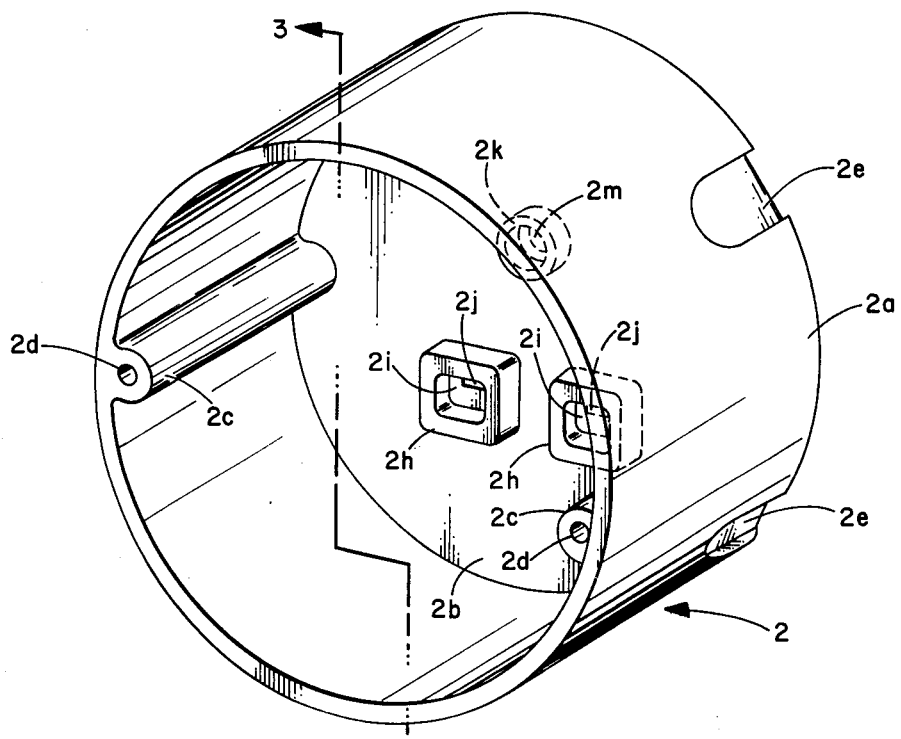
Fig. 2.
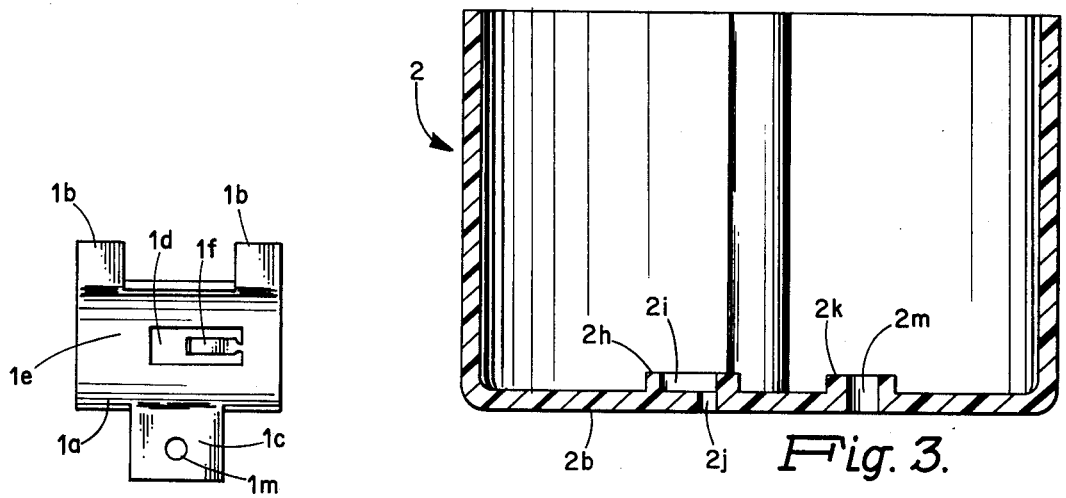
Fig. 3.
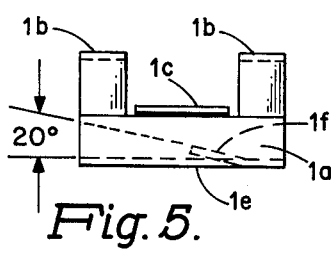
Fig. 4.
Fig. 5.
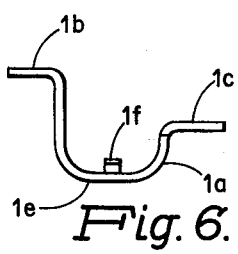
Fig. 6.

CLAMP FOR SECURING BAR HANGER TO ELECTRICAL WIRING BOX

BACKGROUND OF THE INVENTION

The present invention relates to a clamp and, more particularly, to a clamp for clamping an adjustable bar hanger against a molded thermosetting plastic electrical wiring box without causing physical damage to the wiring box such as cracking or shattering.

Bar hangers for use with molded thermosetting plastic electrical wiring boxes for positioning the electrical wiring boxes with respect to supporting structures, for example, between studs or joists, are well known in the art. These bar hangers are normally mounted or secured to electrical wiring boxes, for example, in a factory assembly operation, and are commonly adjustable lengthwise in the field to permit installers in the field to accommodate the wiring boxes to variations in spacing between studs and joists. In one well known assembly of a thermosetting plastic electrical wiring box and bar hanger, the bar hanger is first positioned within a generally U-shaped portion of a clamp having side flanges, and the wiring box is positioned with respect to the clamp and bar hanger assembly so that the bar hanger is captured between the clamp and a rear wall of the wiring box with the flanges of the clamp being spaced a slight distance from the rear wall of the wiring box. At the same time, openings provided in the rear wall of the wiring box are aligned with corresponding threaded openings provided in the flanges of the clamp. Metal screws are then inserted by screw-insertion apparatus through the openings in the rear wall of the wiring box into the threaded openings in the clamp and a rotational torque is applied to the screws to thread the screws into the threaded openings in the flanges. As the screws are tightened, the clamp is drawn toward the rear wall of the wiring box and the bar hanger is caused to be clamped and retained in position against the wiring box. Desirably, the metal screws are tightened by an amount no more than is necessary to insure that the bar hanger will not become loosened and separate from the rest of the assembly during shipment of the assembly. Further, the screws should not be tightened so much as to cause the wiring box to crack or shatter at the points or region of entry of the screws into the wiring box, thereby rendering the wiring box non-usable.

While the above-described assembly operation has been used successfully for some time, it is possible, due to inherent variations in wiring boxes, clamps and bar hangers and inherent variations in assembly operations, for the screw-insertion apparatus to occasionally apply an excessive amount of force or torque to screws and cause a wiring box to be cracked, shattered, or otherwise damaged and thereby rendered non-usable. This result is possible since the screw-insertion apparatus, being mechanical and non-human in nature, is unable to exercise the degree of control and discretion over its screw-tightening operations that an installer would in the field. The present invention is directed to a solution to the above problem.

BRIEF SUMMARY OF THE INVENTION

In accordance with the present invention, a clamp is provided for assembly with a bar hanger and electrical wiring box which overcomes the problem as described hereinbefore. The clamp in accordance with the invention includes a generally U-shaped portion, a generally L-shaped tab at one side of the generally U-shaped portion, and a flange extending outwardly from the other side of the generally U-shaped portion. The generally U-shaped portion further has a deformable means, for example, in the form or nature of a deformable tab, directed from the horizontal portion of the generally U-shaped portion into the region defined by the generally U-shaped portion. The L-shaped tab as described hereinabove has its horizontal portion extending outwardly from the associated side of the generally U-shaped portion and is adapted to be inserted into a corresponding opening in a wall of the wiring box so that the generally L-shaped tab and the wiring box can pivot with respect to each other through a predetermined angle. The flange as described hereinabove further has an opening therein corresponding to and adapted to be used with another opening in the wall of the wiring box. The latter may be of a material such as a thermosetting plastic composition.

The clamp as described hereinabove is operative when a bar hanger is to be secured to the aforesaid wall of the electrical wiring box to receive the bar hanger within the generally U-shaped portion and, after the L-shaped tab and the wiring box have pivoted with respect to each other through the aforesaid predetermined angle, to capture the bar hanger against the wall of the wiring box with the deformable means bearing against the bar hanger and the flange being spaced from the wall of the wiring box with the opening therein being positioned for cooperation with the other opening in the wall of the wiring box. The opening in the flange is adapted to be used with a fastener and the other opening in the wall of the wiring box to draw the clamp in a direction toward the wall of the wiring box for securing the clamp and the bar hanger within the generally U-shaped portion to the wall of the wiring box. The deformable means operates when the clamp is drawn toward the wall of the wiring box to deform and to move in a direction away from the wall of the wiring box and toward the horizontal portion of the generally U-shaped portion. The deformation of the deformable means as described above serves to distribute the energy applied to the fastener in a manner so as to prevent damage to the wiring box, such as cracking or shattering.

BRIEF DESCRIPTION OF THE DRAWING

Various objects, features and advantages of a clamp as employed with a bar hanger and an electrical wiring box in accordance with the present invention will be apparent from the following detailed discussion taken in conjunction with the accompanying drawing in which:

FIG. 2 is a perspective view of the electrical wiring box of FIG. 1 showing additional details of the electrical wiring box;

FIG. 3 is a cross-sectional view of the electrical wiring box of FIG. 2, taken along the line 3—3 in FIG. 2;

FIGS. 4, 5 and 6 are top, front and side view, respectively, of the clamp in accordance with the invention;

DETAILED DESCRIPTION OF THE INVENTION

Figure 1:
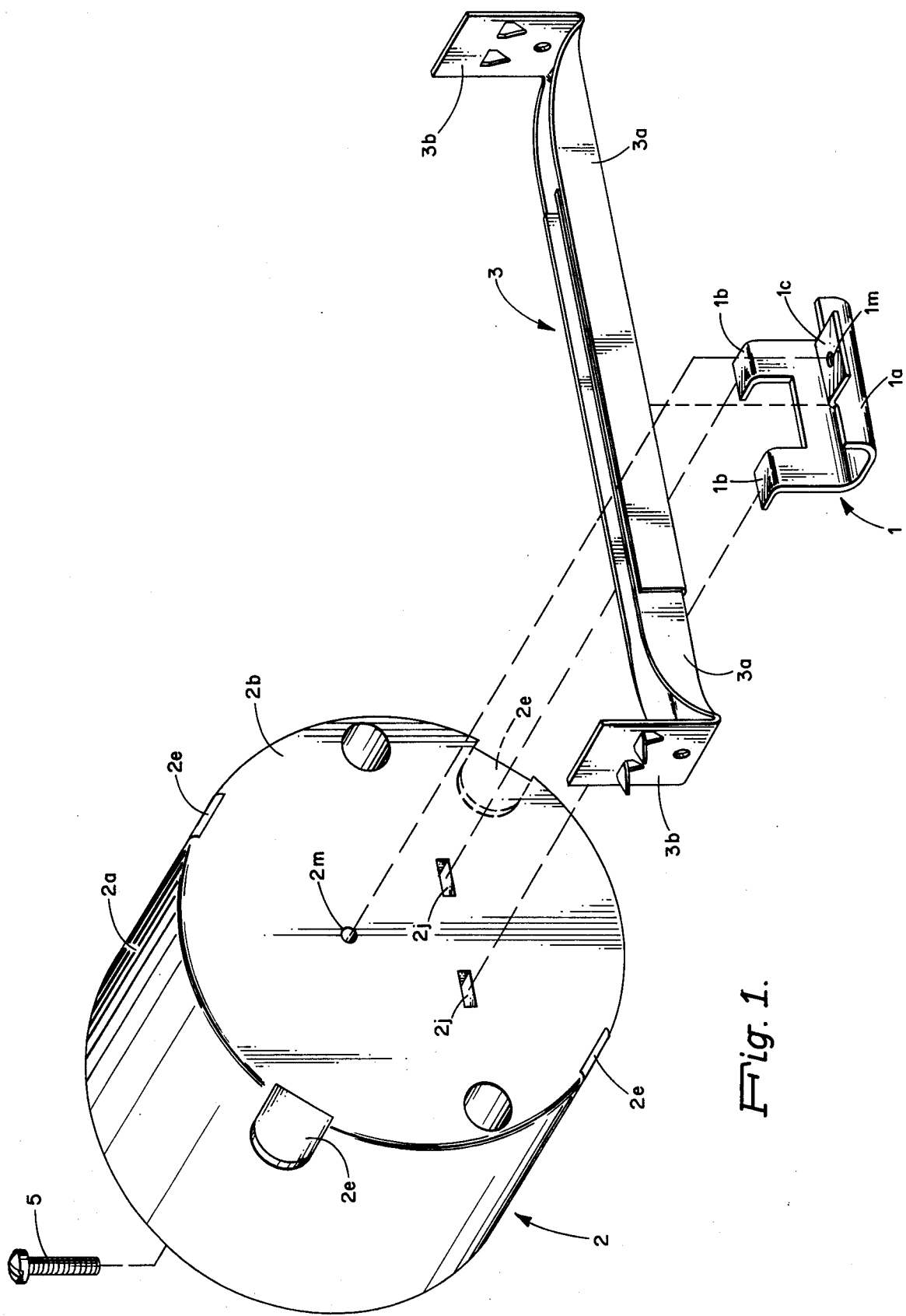
FIG. 1 is an exploded perspective view illustrating a clamp as employed with a bar hanger and an electrical wiring box in accordance with the present invention, the aforesaid elements being illustrated in their positions at the time of assembly.

Referring now to FIG. 1, there is shown in a perspective view a clamp 1 as employed together with an electrical wiring box 2 and a bar hanger 3 in accordance with the present invention. The abovementioned elements 1, 2 and 3 are illustrated in FIG. 1 in their positions just prior to assembly.

The electrical wiring box 2, which is shown in greatest detail in FIGS. 1 and 2, is of a ceiling-box type and includes a generally cylindrical wall 2a interconnected with a flat rear wall 2b. These walls define an opening at the front of the wiring box 2 and further enclose a space or volume for receiving an electrical device such as a light fixture, receptacle or switch as well as wires and other electrical connections associated with the electrical device. The electrical device is secured to the wiring box 2 by means of a pair of bosses 2c (FIG. 2) formed integrally with the cylindrical wall 2a, these bosses having openings 2d formed therein for receiving fasteners (e.g., threaded screws) for securing the electrical device to the bosses 2c. The cylindrical wall 2a further includes knockout elements 2e which may be removed selectively as desired for the entrance of wire cables to make electrical connection to an electrical device which is to be mounted within the wiring box 2. The electrical wiring box 2 as described hereinabove further includes a pair of interior spaced-apart generally rectangular bosses 2h integral with the rear wall 2b and defining recesses 2i. These recesses 2i communicate with generally rectangular slots 2j in the rear wall 2b, as best shown in FIGS. 1-3. The wiring box 2 further has a boss 2k formed in the rear wall 2b thereof and surrounding an opening 2m. As will be discussed in greater detail hereinafter, the recesses 2i, the slots 2j, and the opening 2m of the wiring box 2 are employed during the assembly together of the wiring box 2, the bar hanger 3 and the clamp 1. The electrical wiring box 2 as described hereinabove is suitably fabricated from a thermosetting plastic material, using standard molding techniques as are well understood by those skilled in the art.

The bar hanger 3 as employed in the present invention, shown in detail in FIG. 1, is of a conventional design and includes first and second elongated channel members 3a, for example, of stamped and formed sheet metal, which are arranged to slide with respect to each other in a telescoping fashion to enable the bar hanger 3 to be adjusted by an installer in the field to accommodate a wide range of spacings between studs or joists. The channel members 3a further include conventional pronged attachment elements 3b at the remote ends thereof for attaching the bar hanger 3 and the wiring box 2 secured thereto to a pair of spaced-apart supporting structures such as wood studs or joists.

The clamp 1 as employed in the present invention together with the wiring box 2 and the bar hanger 3 is shown in greatest detail in FIGS. 4-6 and includes a generally U-shaped portion 1a, a pair of spaced-apart L-shaped tabs 1b integral with one side of the U-shaped portion 1a, and a flange 1c integral with and extending outwardly from the other side of the U-shaped portion 1a. The U-shaped portion 1a further has an opening 1d formed in a curved part 1e thereof and a deformable tab 1f adjacent to one edge of the opening 1d and extending upwardly at an angle (e.g., 20°), as best shown in FIG. 5, into the region defined by the U-shaped portion 1a. As will be described in detail hereinafter, the tab 1f is arranged to be deformed and to move downwardly to a position nearly flush with the bottom surface of the bar hanger 3 and the curved part 1e of the U-shaped portion 1a during the assembly together of the clamp 1, the bar hanger 3 and the wiring box 2. The flange 1c of the clamp 1 as described hereinabove further includes a threaded opening 1m therein which, as will be described in greater detail herinafter, is adapted to be aligned with and used in conjunction with the opening 2m in the rear wall 2b of the wiring box 2 during the assembly together of the clamp 1, the bar hanger 3 and the wiring box 2. As best indicated in FIGS. 1 and 6, the plane of the flange 1c is spaced from the plane of the horizontal parts of the L-shaped tabs 1b, for the purpose of facilitating the assembly of the clamp 1 with the bar hanger 3 and the wiring box 2 as will be evident hereinafter. The clamp 1 as described hereinabove may be suitably fabricated from sheet metal, using well known metal stamping and forming techniques.

Figure 7:
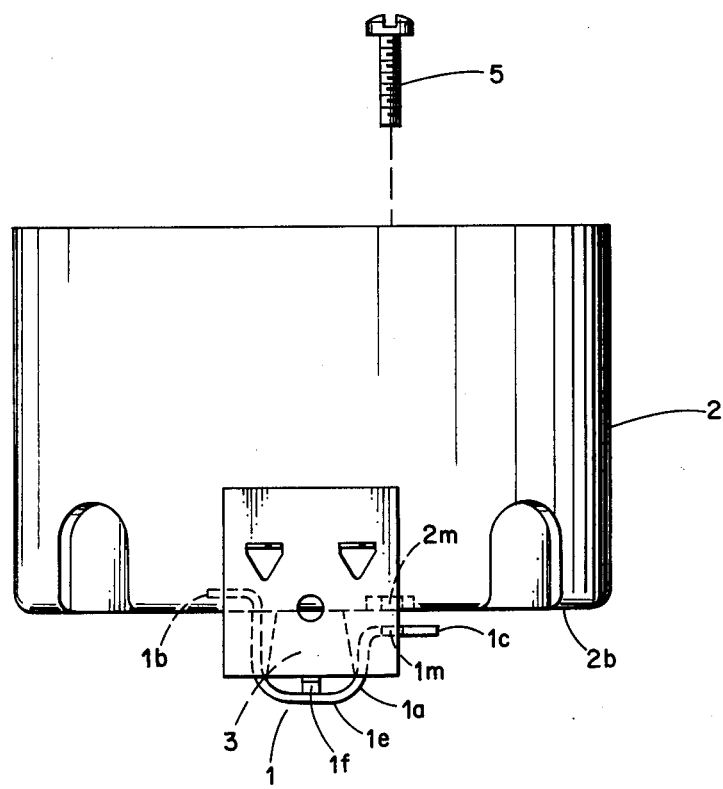
FIG. 7 is an end view illustrating the clamp, bar hanger and electrical wiring box as arranged prior to final assembly.
Figure 8:
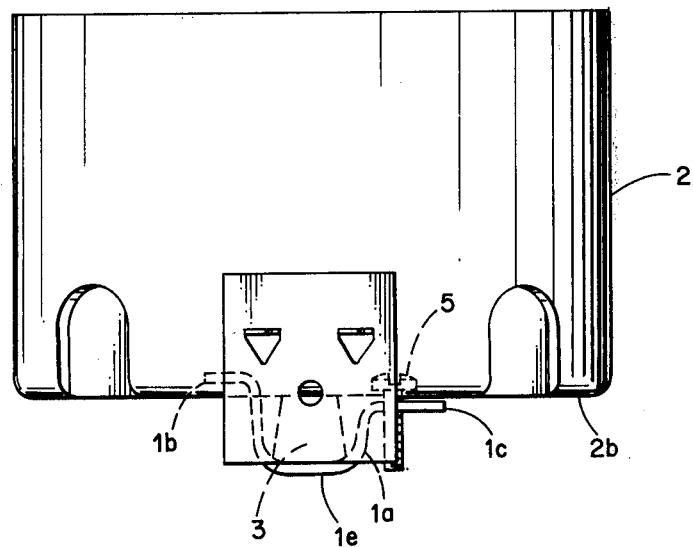
FIG. 8 is an end view illustrating the clamp, bar hanger and electrical wiring box in their final assembled form.

To assemble the clamp 1, the bar hanger 3 and the wiring box 2 together, specifically, to their final assembly positions as indicated in FIG. 8, the clamp 1 is first positioned as shown in FIG. 1, as by a jig or clamping apparatus, and the bar hanger 3 is positioned within the U-shaped portion 1a of the clamp 1. The wiring box 2 is then oriented with respect to the clamp 1, as also shown in FIG. 1, so that the slots 2j formed in the rear wall 2b of the wiring box 2 are aligned with the horizontal parts of the L-shaped tabs 1b. The horizontal parts of the L-shaped tabs 1b are then inserted within the slots 2j in the wiring box 2, and the wiring box 2 is then pivoted with respect to the assembly of the clamp 1 and the bar hanger 3, for example, through an angle of about 90°, so that the L-shaped tabs 1b of the clamp 1 are positioned within the recesses 2i in the bosses 2h of the wiring box 2, the bar hanger 3 is captured between the U-shaped portion 1a of the clamp 1 and the rear wall 2b of the wiring box 2, and the opening 2m in the rear wall 2b of the wiring box 2 is aligned with the threaded opening 1m in the tab 1c of the clamp 1. The positions of the clamp 1, the bar hanger 3 and the wiring box 2 following the abovementioned pivoting of the wiring box 2 with respect to the clamp 1 and the bar hanger 3 is shown in FIG. 7. As is evident from FIG. 7, following the pivoting of the wiring box 2 with respect to the clamp 1 and the bar hanger 3, the clamp 1 is spaced a slight distance from the surface of the rear wall 2b of the wiring box 2, by virtue of the presence of the upwardly directed deformable tab 1f, and the tab 1f bears directly against the bottom surface of the bar hanger 3 with the curved part 1e of the clamp 1 being spaced a slight distance away from the bottom surface of the bar hanger 3. A screw, such as shown at 5 in FIGS. 1 and 7, is then inserted by standard screw-insertion apparatus (not shown) through the opening 2m in the rear wall 2b of the wiring box 2 and into the single opening 1m in the clamp 1, and a rotational torque is applied to the screw 5 to thread the screw 5 into the opening 1m. As the screw 5 advances into the opening 1m, the clamp 1 is drawn toward the rear wall 2b of the wiring box 2, causing the tab 1f of the clamp 1 to deform and move downwardly in a direction away from the wiring box 2 and toward the curved part 1e of the clamp 1. The deformation of the tab 1f serves to distribute the torque or energy applied to the screw 5 over the entire clamp 1, principally to the U-shaped portion 1a, rather than principally to the tabs 1b and the flange 1c. As a result of this distribution of the torque or energy applied to the screw 5, damage to the wiring box 2, specifically, cracking or shattering of the wiring box 2 in the region underlying the clamp 1, is effectively prevented. When the clamp 1 has been completely secured to the wiring box 2, as indicated in FIG. 8, the flange 1c of the clamp 1 nearly abuts against the rear wall 2b of the wiring box 2, and the bar hanger 3 is retained within the U-shaped portion 1a of the clamp 1 and completely confined between the curved part 1e of the clamp 1 and the rear wall 2b of the wiring box 2. The tab 1f of the clamp 1 continues to bear against the bar hanger 3 but it is now more or less flush with the bottom surface of the bar hanger 3 and with the curved part 1e of the clamp 1. It is further to be appreciated that the use of only a single screw 5 with the clamp 1, as opposed to the use of more than one screw, further serves to reduce or minimize the possibility of the wiring box 2 being damaged during threading of the screw into the clamp 1.

It is believed that it will now be apparent that a clamp 1 has been described hereinabove which is simple in design and use and, by the simple provision of a deformable tab 1f, the positioning tabs 1b, and the flange 1c usable with only a single screw 5 as described hereinabove, is capable of reducing substantially the potential damage to wiring boxes such as cracking or shattering. In using the clamp 1 as described hereinabove, it is unnecessary to alter the amount of energy or torque as is normally applied to screws used with the aforedescribed prior art clamps. Accordingly, there is no need to modify the existing screw-insertion apparatus.

While there has been described what is considered to be a preferred embodiment of the invention, it will be obvious to those skilled in the art that various changes and modifications may be made therein without departing from the invention as called for in the appended claims.

What is claimed is:

1. An assembly comprising:
   an electrical wiring box having a wall, said wall having a pair of openings therein;
   a bar hanger;
   a clamp for securing the bar hanger to the wall of the electrical wiring box, said clamp comprising:
   a generally U-shaped portion having deformable means directed from the horizontal portion of the generally U-shaped portion into the region defined by the generally U-shaped portion;
   a generally L-shaped tab at one side of the generally U-shaped portion, the horizontal portion of the generally L-shaped tab extending outwardly from the aforesaid side of the generally U-shaped portion, said generally L-shaped tab being adapted to be inserted into one of the openings in the wall of the wiring box and permitting the generally L-shaped tab and the wiring box to pivot with respect to each other through a predetermined angle;
   a flange extending outwardly from the other side of the generally U-shaped portion and having an opening therein corresponding to the other opening in the wall of the wiring box;
   said clamp being operative when the bar hanger is to be secured to the wall of the electrical wiring box to receive said bar hanger within the generally U-shaped portion and, after the generally L-shaped tab and the wiring box have pivoted with respect to each other through the aforesaid predetermined angle, to capture the bar hanger against the wall of the wiring box with the deformable means bearing against the bar hanger and the flange being spaced from the wall of the wiring box with the opening therein being positioned for cooperation with the aforesaid other opening in the wall of the wiring box; and
   a fastener cooperating with the opening in the flange and the aforesaid other opening in the wall of the wiring box to draw the clamp in a direction toward the wall of the wiring box for securing the clamp and bar hanger within the generally U-shaped portion to the wall of the wiring box, said deformable means being operative when the clamp is drawn toward the wall of the wiring box to deform and to move in a direction away from the wall of the wiring box and toward the horizontal portion of the generally U-shaped portion of the clamp.

2. An assembly in accordance with claim 1 wherein:
   the deformable means includes a deformable tab directed at an angle from the horizontal portion of the generally U-shaped portion of the clamp into the region defined by the generally U-shaped portion.

3. An assembly in accordance with claim 2 wherein:
   the horizontal portion of the generally L-shaped tab is in a plane generally parallel to and spaced from the plane of the flange.

4. An assembly in accordance with claim 3 wherein:
   the fastener used with the opening in the flange is adapted to be used with a threaded fastener.

5. An assembly comprising:
   an electrical wiring box having a wall, said wall having first, second and third openings therein;
   a bar hanger;
   a clamp for securing the bar hanger to the wall of the electrical wiring box, said clamp comprising:
   a generally U-shaped portion having deformable means directed from the horizontal portion of the generally U-shaped portion into the region defined by the generally U-shaped portion;
   first and second generally L-shaped tabs at one side of the generally U-shaped portion, the horizontal portions of the generally L-shaped tabs extending outwardly from the aforesaid side of the generally U-shaped portion, said generally L-shaped tabs being adapted to be inserted into the first and second openings in the wall of the wiring box and permitting the generally L-shaped tabs and the wiring box to pivot with respect to each other through a predetermined angle; and
   a flange extending outwardly from the other side of the generally U-shaped portion and having a single opening therein corresponding to the third opening in the wall of the wiring box;
   said clamp being operative when the bar hanger is to be secured to the wall of the electrical wiring box to receive said bar hanger within the generally U-shaped portion and, after the generally L-shaped tabs and the wiring box have pivoted with respect to each other through the aforesaid predetermined angle, to capture the bar hanger against the wall of the wiring box with the deformable means bearing against the bar hanger and the flange being spaced from the wall of the wirng box with the opening therein being positioned for cooperation with the third opening in the wall of the wiring box; and a fastener cooperating with the opening in the flange and the third opening in the wall of the wiring box to draw the clamp in a direction toward the wall of the wiring box for securing the clamp and bar hanger within the generally U-shaped portion to the wall of the wiring box, said deformable means being operative when the clamp is drawn toward the wall of the wiring box to deform and to move in a direction away from the wall of the wiring box and toward the horizontal portion of the generally U-shaped portion of the clamp.

6. An assembly in accordance with claim 5 wherein: the deformable means includes a deformable tab directed at an angle from the horizontal portion of the generally U-shaped portion of the clamp into the region defined by the generally U-shaped portion.

7. An assembly in accordance with claim 6 wherein: the horizontal portions of the generally L-shaped tabs are in a plane generally parallel to and spaced from the plane of the flange.

8. An assembly in accordance with the claim 7 wherein:

the fastener used with the opening in the flange is a threaded fastener.

* * * * *